United States Patent [19]

Collins

[11] 4,034,874

[45] July 12, 1977

[54] HOSE SUPPORTING LINKAGE

[75] Inventor: Cager K. Collins, Fairview, Ill.

[73] Assignee: International Harvester Company, Chicago, Ill.

[21] Appl. No.: 408,205

[22] Filed: Oct. 19, 1973

[51] Int. Cl.² .......................................... E02F 3/70
[52] U.S. Cl. ......................... 214/140; 214/DIG. 11; 248/68 R; 280/421
[58] Field of Search ........... 214/140, 148, DIG. 11; 280/420, 421, 422; 248/49, 51, 52, 68 R

[56] References Cited

U.S. PATENT DOCUMENTS

| 2,177,128 | 10/1939 | Johnson | 248/49 |
|---|---|---|---|
| 2,879,020 | 3/1959 | Wheeler | 280/421 |
| 3,084,765 | 4/1963 | Cook | 214/DIG. 11 |
| 3,399,909 | 9/1968 | Ambrose | 248/68 R |
| 3,776,403 | 12/1973 | Billings | 214/DIG. 11 |
| 3,799,197 | 3/1974 | Gibbons | 248/49 |

Primary Examiner—Robert J. Spar
Assistant Examiner—Ross Weaver
Attorney, Agent, or Firm—Ronald C. Kamp; Floyd B. Harman

[57] ABSTRACT

A linkage for supporting the hoses extending between a fixed portion of a machine and a shiftable carriage mounted on the fixed portion. A pair of links are pivotally interconnected with one of the links pivotally connected to the carriage and the other pivotally connected to the fixed portion. A clamp means is carried by the pivotal interconnection of the links and secures the hoses to the linkage to control the flexure thereof as the carriage is shifted.

3 Claims, 2 Drawing Figures

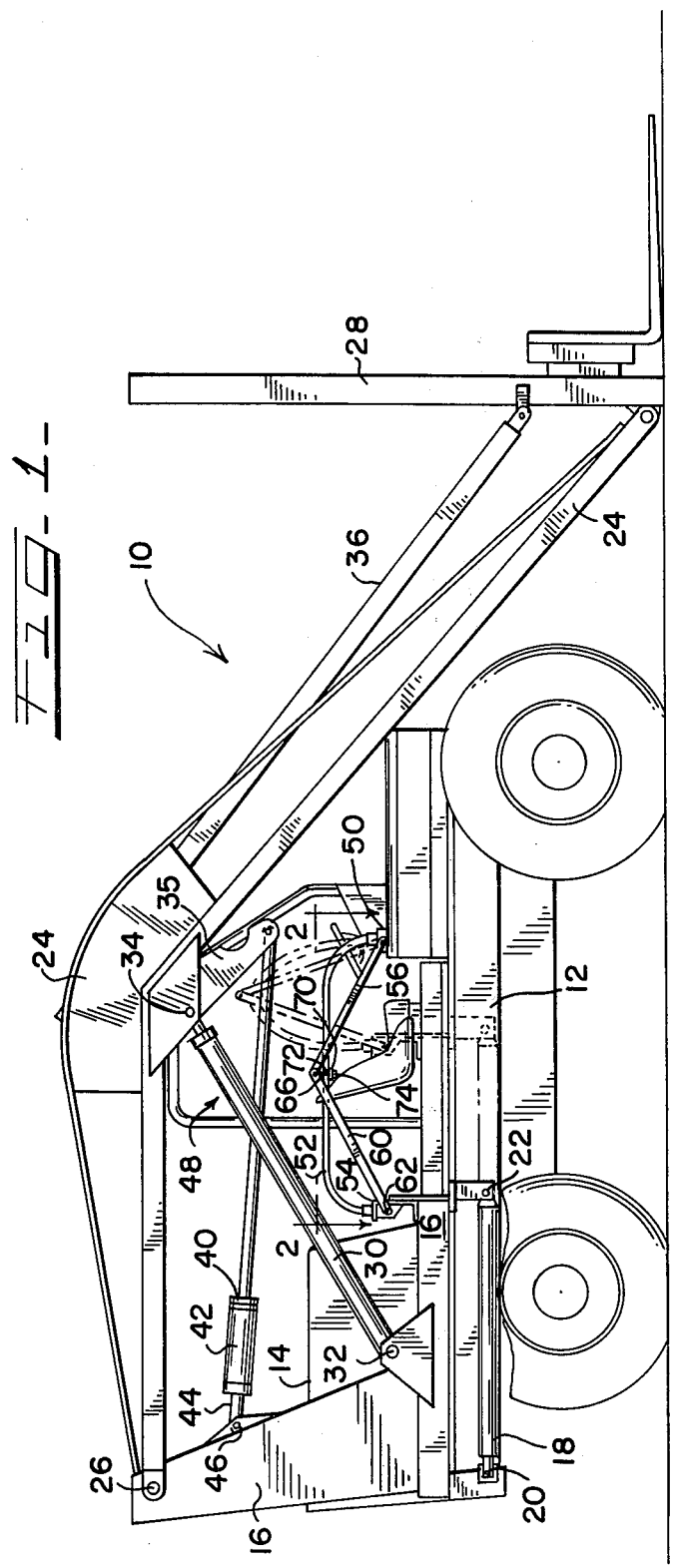
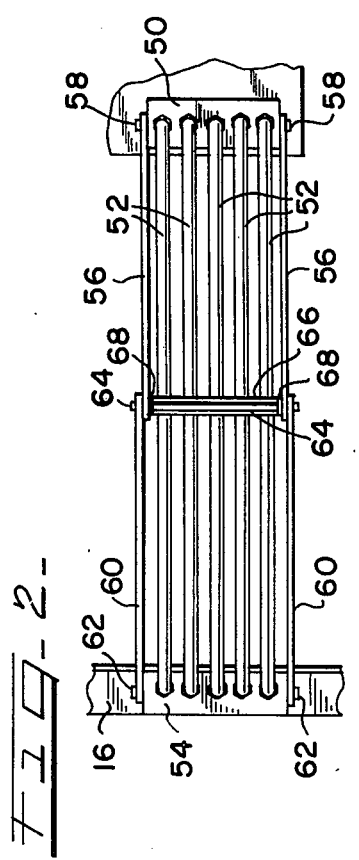

HOSE SUPPORTING LINKAGE

BACKGROUND AND SUMMARY OF THE INVENTION

On machines that have a shiftable carriage, such as high lift fork lifts, it is frequently necessary to provide flexible hoses which extend between the carriage and a fixed portion of the machine. As the carriage is shifted fore and aft on the machine, the hoses flex and bend. Without some control over the flexure and bending, it is possible for the hoses to become abraded by contact with other elements on the machine, or to become cut or pinched either by the carriage or one of the other machine components. Damage to the hoses is highly undesirable because the hydraulic fluid being passed therethrough is hot and any discharge from the hoses can be of potential danger to the operator, creates an unsightly condition of the machine, and has a potential for creating a malfunction of the machine itself.

It is therefore an object of this invention to provide a means for controlling the flexure and bending of hydraulic hoses extending between a fixed portion of the machine and a shiftable carriage thereon.

It is also an object of this invention to provide a hole supporting linkage which minimizes the possibility of damaging the hydraulic hoses, maximizes the service life for the machine and minimizes the expense and time of maintaining the machine.

These and other objects of the present invention will become readily apparent upon a perusal of the following description and the accompanying drawings, wherein:

FIG. 1 is a side elevational view of a machine incorporating the present invention; and FIG. 2 is a top plan view, taken on line 2—2 of FIG. 1, showing the hose supporting linkage of the present invention.

DESCRIPTION OF A PREFERRED EMBODIMENT

Referring now to the figures of the drawing, there is shown a high lift fork lift, indicated generally at 10, which may be of the type disclosed in a commonly assigned, co-pending application of Lloyd A. Vander Burgh, entitled High Lift Fork Lift, filed the same day as this application. The machine 10 includes a wheeled frame 12 on which an engine 14 is mounted. A carriage 16 is mounted on the frame 12 and is capable of being shifted fore and aft relative to the frame by means of a hydraulic ram 18 which is pinned to the frame 12 at 20 and to the carriage at 22. Hence, extension of the hydraulic ram 18 will move the carriage to the right as viewed in FIG. 1 and retraction of the ram 18 will move the carriage to the position shown therein. A boom 24 is pivotally connected at 26 to the upper portion of the carriage 16 and pivotally supports at its free end a fork lift mast 28. A boom cylinder 30 is pivotally connected to the carriage at 32 and at 34 to the boom 26. Extension of the boom ram 30 will rotate the boom 24 about the pin 26 elevating the mast 28. Similarly, contraction of the ram 30 will lower the mast 28 to the position shown in FIG. 1.

A self-leveling linkage is provided for the mast 28 and comprises a bellcrank 35 which is pivotally mounted about the same axis as the pin 34 on the boom 24 with a link 36 pivotally attached at one end to the upper arm of the bellcrank 35 and at the other end to the mast 28. A link 38 is pivotally attached to the lower arm of the bellcrank 35. Each of the bellcrank 35, the link 36, and the link 38 in actuality comprise a pair of links laterally spaced, preferably positioned equal distance on either side of the longitudinal centerline of the machine 10. A plate 40 extends transverse of the centerline of the machine 10 is secured to the ends of the links 38. A hydraulic ram 42 has its head end secured to the plate 40 and its rod 44 pivotally connected at 46 to the carriage 16. The lateral spacing of the links 38 and the bellcranks 35 provide an open space therebetween to accommodate and avoid interference with the hoses and hose supporting linkage, in a manner to be hereinafter described.

The engine 14 drives a hydraulic pump, not shown, which supplies hydraulic fluid under pressure to a bank of control valves located in the operator's compartment, indicated generally at 48. The bank of control valves are connected with a manifold 50 located on the frame of the machine 10. The pump, the bank of control valves and the connection therebetween and with the manifold 50 is conventional and it is believed that a detailed description thereof, beyond the foregoing, is unnecessary. A plurality of flexible hoses 52 extend between the manifold 50 and a second manifold 54 secured to the carriage 16. The manifold 54 has a plurality of conventional fittings which permit communication with the cylinders 18, 30, and 42.

The hose supporting linkage comprises a pair of links 56, which are pivotally connected to the manifold 50 by means of pivotal connections 58, and a pair of links 60 which are pivotally connected to the manifold 54 by means of pins 62. A pin 64 extends through the adjacent ends of the links 56 and 60 to pivotally interconnect the same. An upper plate 66 has upturned end portions 68 which are pivotally secured to the pin 64. The hoses 52 pass between the upper plate 66 and a lower plate 70 and the hoses are clamped therebetween by means of threaded studs 72 which extends down from the upper plate 66, through the lower plate 70 and are engaged by nuts 74 to draw the lower plate 70 toward the upper plate 66. The clamping means which comprises the upper plate 66, the lower plate 70, and the threaded studs 72 and the nuts 74, is itself pivotally suspended from the pin 64. It will be understood that the hoses 52 must have sufficient length to span the maximum distance between the fixed manifold 50 and the manifold 54 with the carriage 16 in its rearmost position, as shown in FIG. 1, without subjecting the hoses to undue strain or to sharp bends. When the carriage 16 is moved in a forward direction, as by extension of the ram 18, the two links 60 and 56 will hold to the position shown in FIG. 1 by dotted lines. In order to prevent stressing of the hose connections to either of the manifolds, it is preferable that the two pairs of links 56 and 60 be of equal length. By positioning the manifolds near the longitudinal centerline of the machine, the links 58 and 60 and the hoses 52 may pass between the laterally spaced links 38 and the laterally spaced bellcranks 35 without any interference as the carriage is moved forward.

While a preferred embodiment of the present invention has been shown and described herein, it will be appreciated that changes and modifications may be made without departing from the spirit of the invention as defined by the scope of the appended claims.

What is claimed is:

1. In a material handling machine having a wheeled frame, a carriage mounted on said frame for fore and aft movement, hydraulically actuated equipment carried by said carriage and a source of hydraulic fluid pressure on said frame; the improvement comprising:
  a first manifold on said carriage communicating with said equipment;
  a second manifold on said frame capable of communication with said source;
  a plurality of hoses extending between said manifolds;
  a first pair of links pivotally connected at one end to said carriage;
  a second pair of links pivotally connected at one end to said frame;
  pin means interconnecting the free ends of said first and second pairs of links; and
  clamp means for securing said hoses to said pin means.

2. In a material handling machine according to claim 1, wherein said clamp means comprises;
  a first plate pivotally carried by said pin means;
  a second plate positioned so that said hoses pass between said first and second plates; and
  means for drawing said plates together to clamp said hoses therebetween.

3. In a material handling machine according to claim 2, wherein:
  said links are all substantially the same length.